United States Patent [19]
Klement et al.

[11] 3,800,624
[45] Apr. 2, 1974

[54] WINDSHIELD WIPER PARTICULARLY FOR AUTOMOTIVE VEHICLES

[76] Inventors: Heribert Klement, 5 Holzwiesenstrasse; Heinz Jakob, 15 Frankfurter Strasse, both of 712 Bietigheim, Germany

[22] Filed: Mar. 23, 1971

[21] Appl. No.: 127,310

[30] Foreign Application Priority Data
Mar. 24, 1970 Germany.......................... 2014051

[52] U.S. Cl............................. 74/600, 15/250.17
[51] Int. Cl.............................................. G05g 1/00
[58] Field of Search...................... 74/600, 78, 126; 15/250.17

[56] References Cited
UNITED STATES PATENTS

| | | | |
|---|---|---|---|
| 3,242,767 | 3/1966 | Simpson | 74/600 |
| 2,753,023 | 7/1956 | Marvin | 15/250.17 |
| 2,753,721 | 7/1956 | Latta | 15/250.17 |
| 3,115,599 | 12/1963 | Ziegler | 74/600 |
| 3,153,950 | 10/1964 | Andrews | 74/600 |
| 3,197,796 | 8/1965 | Kato et al. | 15/250.17 |
| 3,588,940 | 6/1971 | Mainka et al. | 74/600 |

*Primary Examiner*—Charles J. Myhre
*Assistant Examiner*—Wesley S. Ratliff, Jr.
*Attorney, Agent, or Firm*—McGlew & Tuttle

[57] ABSTRACT

A windshield wiper has a repose or parking position of the wiper arms which is outside the wiping field, and includes a switching device actuated, responsive to opening of the wiper motor control switch, to initiate a response movement by variation of the radius of a crank secured to a driven shaft driven by the wiper motor. A first crank part is secured to the driven shaft and serves as a guiding part, and a second crank part is supported and guided by the first crank part for limited adjustment longitudinally of the crank. Springs, which may be tension springs or compression springs, are engaged between the first and second crank parts and bias the second crank part in one direction relative to the driven shaft. A control element, such as the armature of a solenoid or electromagnetic device, is protruded into the path of movement of the second crank part responsive to energization of the switching device to adjust the relative position of the second crank part in opposition to the springs to vary the crank radius for the additional respose movement. Either the crank radius may be increased or the crank radius may be decreased for the additional repose movement.

15 Claims, 6 Drawing Figures

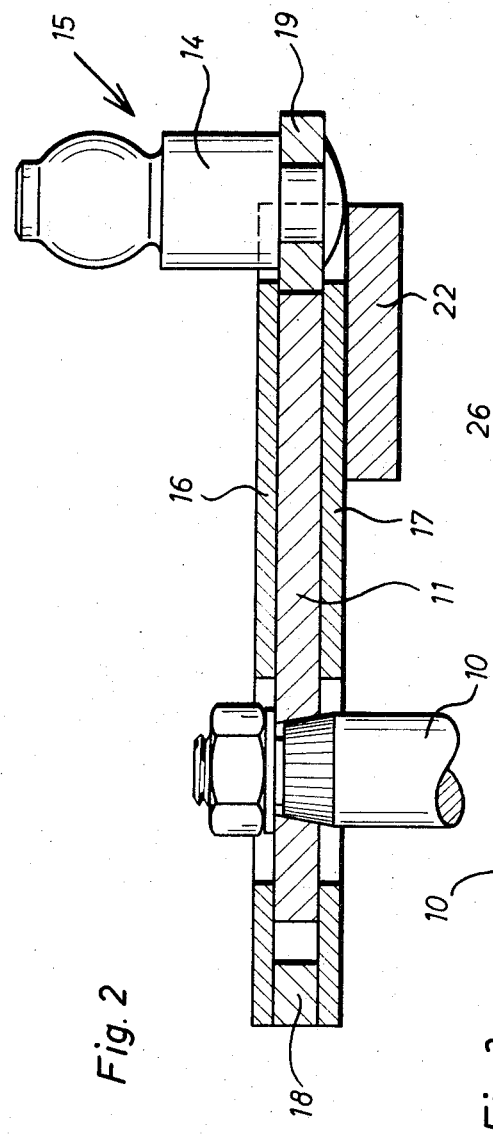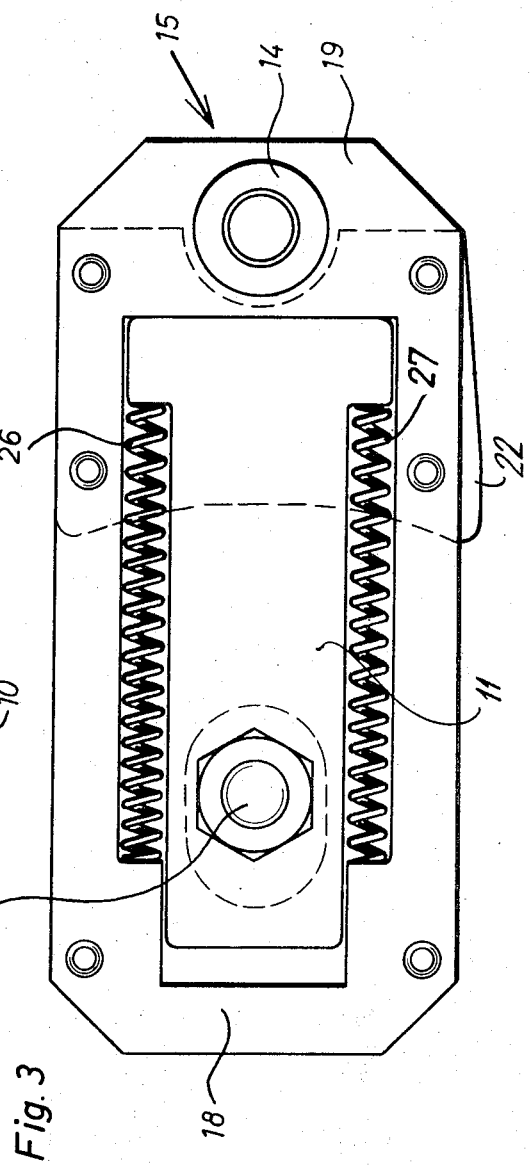

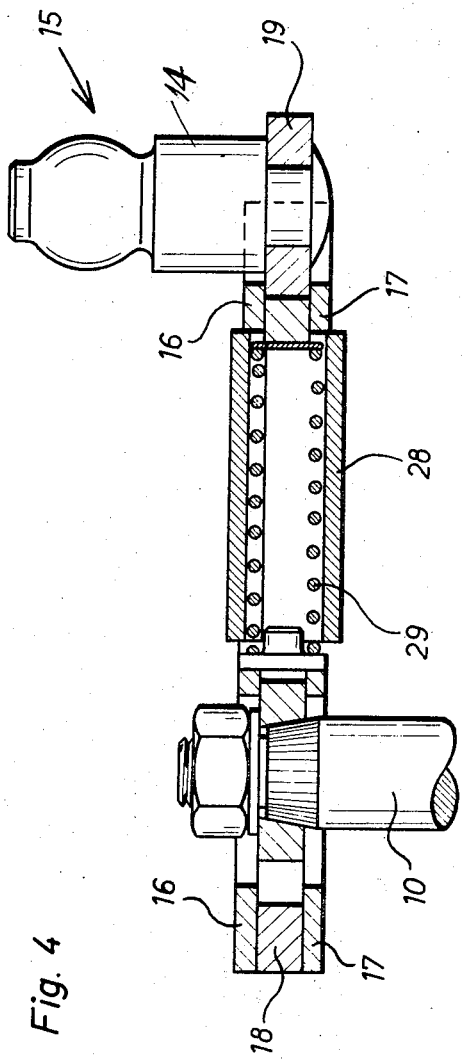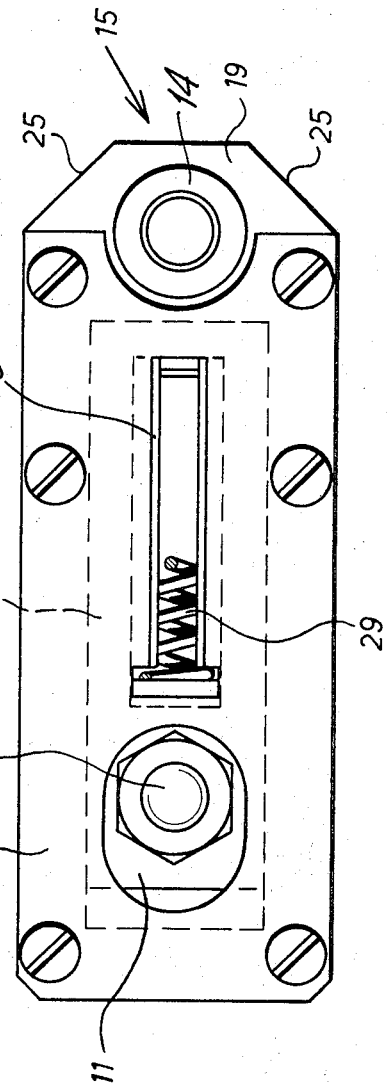

WINDSHIELD WIPER PARTICULARLY FOR AUTOMOTIVE VEHICLES

BACKGROUND OF THE INVENTION

There are known windshield wiper systems wherein the initiation of an additional repose or parking movement is executed by a reversal of the direction of rotation of the drive motor. With opening of the motor control switch, the drive motor is reversed as to its direction of rotation. This necessitates a powerful drive motor because of the acceleration to be executed in the counter direction of rotation. The reversal of rotation of the shaft driven by the motor makes possible, in a simple manner, a release of drive elements, so that the crank radius for the drive linkage is different in the two directions of rotation. This windshield wiper system is costly, in terms of layout, and is especially trouble-prone.

There are also known windshield wiper systems wherein, upon opening of the wiper motor switch, an increased movement for the repose position is executed without reversal of rotation of the drive motor. In these systems, the driven shaft is designed as a tubular shaft in which another shaft is mounted eccentrically. The two shafts are so coupled together, by means of pawls, drive pins and the armature of a switching means, that, in the on-position and with the switching means inactive or deenergized, the crank radius of the drive linkage is adapted to the wiping field. Upon opening of the wiper switch, the switching means is energized and the locking of the two shifts is so changed that the last wiping cycle, or last half cycle, is executed with an increased crank radius. Such a windshield wiper system requires a plurality of complicated parts, which must be produced with great precision to insure trouble-free execution of the different wiping movements. Another disadvantage of these windshield wiper systems is that, if the repose movement is slightly changed, all parts must be redesigned and adapted to the changed repose movement.

The same disadvantages are also present in known drive and control devices for windshield wipers wherein a shaft, carrying a crank, is mounted loosely and eccentrically in a wormwheel driven by an electric motor through the medium of a worm. A locking device is provided between the shaft and the wormwheel, and comprises a drive plate which is secured, against rotation, on the inner end of the shaft. A drive pawl is mounted rotatably on the drive plate, and is provided with a feeler pin. A coupling pawl is rotatably mounted on the drive plate and has a pin which is in positive connection with the drive pawl. A cam track, which is closed, is worked into the worm wheel, and one wall of the cam track widens to form a circling shoulder. The feeler pin of the drive pawl and a guide pin of the coupling pawl engage in this cam track.

To undo the locking between the shaft and the wormwheel, another pawl, of complicated design, is provided, and forms the armature of a switching means and is in connection with a contact device. By this means, it is possible to arrest the shaft while the wormwheel rotates through an additional 180°. Thereby the shaft, and thus the crank, are radially displaced by double the eccentric distance between the pivot points or axes of the shaft and the wormwheel. As a result of this operation, the wiper blades are brought into a repose position which is outside the wiper field.

SUMMARY OF THE INVENTION

This invention relates to windshield wipers for vehicles, particularly automotive vehicles, having a repose or parking position of the wiper arms outside the wiping field, and wherein turning off the wiper switch effects energization of a switching means which initiates a repose movement of variation of the radius of a crank secured to a shaft driven by the windshield wiper motor.

An objective of the invention is to provide such a windshield wiper in which only a few simple parts are required, and which insures a maintenance-free operation and can be added easily to already-installed driving motors. In particular, the novel windshield wiper system design of the invention makes possible a simple adaptation to repose movements of different magnitude and without requiring any new parts.

In accordance with the invention, the crank comprises a first crank guiding part fixedly connected with a shaft driven by the motor, and a second crank part which is supported and guided in the first crank part for limited adjustment longitudinally of the direction of the crank radius. One or more resilient elements, such as springs, bias the second crank part in one direction relative to the driven shaft. When a switching means is energized, a control part extends into the path of movement of the second crank part and, counter to the bias of the spring or springs, adjusts the second crank part in the first and guiding crank part to vary the crank radius for the additional repose movement. The crank, thus divided into two relatively adjustable parts, is simple in construction and requires no maintenance. The displacement path determines the repose movement. Control of the variation of the crank radius is effected by the control member of the fixed switching means, and this control member may be designed directly as an armature of an electromagnetic switching device. The two-part crank can be added to any existing windshield wiper drive.

In accordance with one embodiment of the invention, the crank radius can be varied in such a manner that the resilient means or springs comprise tension springs which retain the crank guiding part and the second crank part in a position providing a small crank radius. Through the control part of the switching means, the guided crank part is displaceable in the guiding or first crank part to increase the crank radius. It is quite conceivable that a variation of the crank radius can also be effected using springs which are compression springs and which retain the first and second crank parts on a large crank radius and, through the control part of the switching means, the second or guided crank part is displaceable in the first or guiding crank part to reduce the crank radius. In order than only an additional repose movement will result, and that the wiping movement and the wiping field will remain uneffected, it is provided, in accordance with another feature of the invention, that the variation of the crank radius can be initiated and executed in the crank position corresponding to a certain wiping field end position, and that the crank variation path determines directly the additional repose movement. The control part of the switching means is then arranged in the corresponding position relative to the crank path.

The length of the displacement path can be fixed, in accordance with a feature of the invention, in that either the control element or the second crank part, or both, carry control cams which effect a given displacement of the second crank part in the first crank part. The control element or part is fixed at a given distance from the driven shaft, and engages the second crank part only when the crank arrives in the given end position, the switching means then being actuated. The given variation of the crank radius then is executed counter to the bias of the springs. When the windshield wiper system is turned on again, the control part releases the second crank part. The resilient elements or springs automatically establish the crank radius which is provided for the normal wiping movement. The normal position between the first and second crank parts is fixed by stops on both parts.

An object of the invention is to provide an improved windshield wiper for automotive vehicles having a repose position of the wiper arms outside the wiping field.

Another object of the invention is to provide such a windshield wiper system requiring only a few simple parts.

A further object of the invention is to provide such a windshield wiper system which has a maintenance-free operation.

Another object of the invention is to provide such a windshield wiper or windshield wiper system which can easily be added to already install the driving motors.

A further object of the invention is to provide such a windshield wiper capable of a simple adaptation to repose movements of different magnitude without requiring new parts.

For an understanding of the principles of the invention, reference is made to the following description of typical embodiments thereof as illustrated in the accompanying drawing.

BRIEF DESCRIPTION OF THE DRAWING

In the drawing:

FIG. 2 is a view, similar to FIG. 1, of a second embodiment of the invention;

FIG. 3 is a top plan view of the crank parts shown in FIG. 2, illustrating the mounting of the springs;

FIG. 4 is a view, similar to FIGS. 1 and 2, of a third embodiment of the invention;

FIG. 5 is a view, similar to FIG. 3, corresponding to FIG. 4; and

DESCRIPTION OF THE PREFERRED EMBODIMENTS

Figure 1:
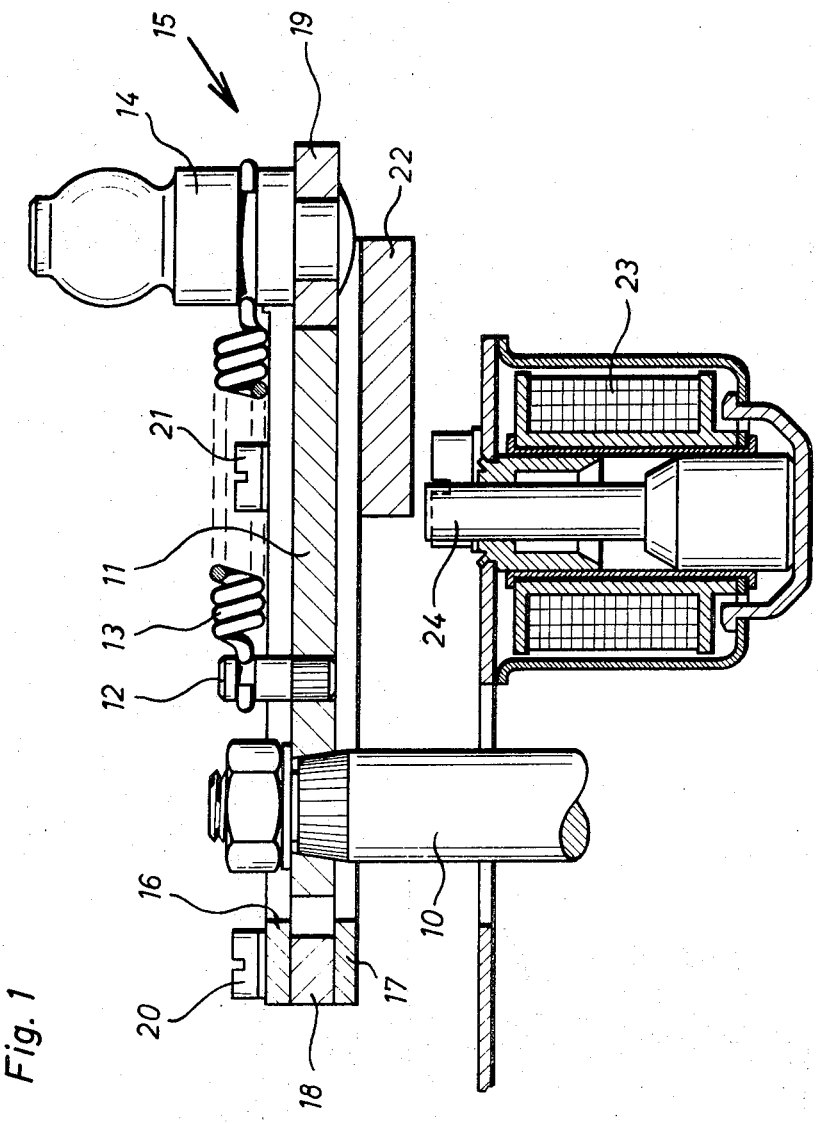
FIG. 1 is a longitudinal sectional view of one embodiment of a divided and adjustable crank in accordance with the invention, and illustrating the controlling switch device.

Referring first to FIG. 1, a shaft 10, driven by the windshield wiper motor, is fixedly connected with a first crank guiding 11, serving for guiding a second crank part 15 for displacement longitudinally of the crank. The second crank part comprises two approximately 0-shaped guide plates 16 and 17 which, through the medium of fastening elements 20 and 21 and spacer elements 18 and 19, are so connected with each other that the crank guiding part 11 and the composite second crank part, which is guided by the part 11, are adjustable relatively to each other to adjust the radial spacing of a joint bolt 14 from driven shaft 10.

The first crank part 11, which is the guiding part, carries a bolt 12 with which is engaged one end of a tension spring 13 whose other end is connected to the joint bolt 14 which is connected, through the spacer 19, with the second crank part 15 formed by the guide plates 16 and 17. Tension spring 13 biases the crank to a small crank radius, as part 19 abuts an end face of crank guiding part 11. Between the other end face of crank guiding part 11 and spacer 18, there is a space or opening which permits a preselected elongation of the crank. Plates 16 and 17 have center cutouts to provide driven shaft 10 and bolt 12 the necessary freedom of movement longitudinally of the crank.

The variation of the crank radius is controlled through a switching device 23 which is positioned at a given distance from driven shaft 10. The alignment of switching device 23 along the crank path is effected in such a way that control part 24, designed as an armature, and when switching device 23 is energized in a wiper field end position of the crank, comes into engagement with the displacement member 22 on crank part 15. Both parts 22 and 24 are adapted to each other, as a control, so that crank part 15 is deflected counter to the bias of spring 13, and the crank radius for joint bolt 14 is correspondingly increased. This variation is carried out when, in the last wiping cycle, displacement member 22 of crank part 15 engages control member 24 of switching device 23 then protruding into the crank path. In the off position, both parts are held in this position by mechanical locking or by electrical excitation of the switching device or by both.

As shown in FIGS. 2 and 3, the resilient elements or springs 26 and 27 may be enclosed. Guide part 11, in the embodiment of the invention shown in FIGS. 2 and 3, is displaceably mounted in a center cutout of the O-shaped spacer having the spacer webs 18 and 19 at its end faces. Plates 16 and 17, in this embodiment, are used as covering plates, and need only have a slot providing for movement relative to driven shaft 10. Springs 26 and 27 are arranged along the longer sides of crank guiding part 11, in an elongated cutout of the spacer plate. At one end, the springs engage an offset of this spacer plate and on the other end the springs engage an offset of first or guiding crank part 11.

The end portion 19 of the spacer plate carries the joint bolt 14 of crank part 15. Springs 26 and 27 bias the spacer plate in the direction of driven shaft 10, so that web 19 strikes against the end face of crank part 11. Setting member 22, facing driven shaft 10, may be designed as a control cam. If springs 26 and 27 are designed as compression springs, then the crank can, in the normal position, have the larger crank radius. The control part of the switching device then brings about a displacement of crank part 15 toward driven shaft 10, leading to a corresponding reduction in the crank radius.

In the embodiment of the invention shown in FIG. 4 and 5, crank guiding part 11 and guide plates 16 and 17 of crank part 15 have center cutouts. Guide plates 16 and 17 are secured, through the medium of the O-shaped spacer plate having the webs 18 and 19, in spaced relation. In the common center cutout, there is mounted a spring 29 which, at one end, is connected with crank guiding part 11 and, at the other end, with the spacer plate or the guide plates 16 and 17. A protective sleeve 28 is slipped over spring 29. The variation of the crank radius can be effected in the same manner as described for the other embodiments of the invention.

Figure 6:
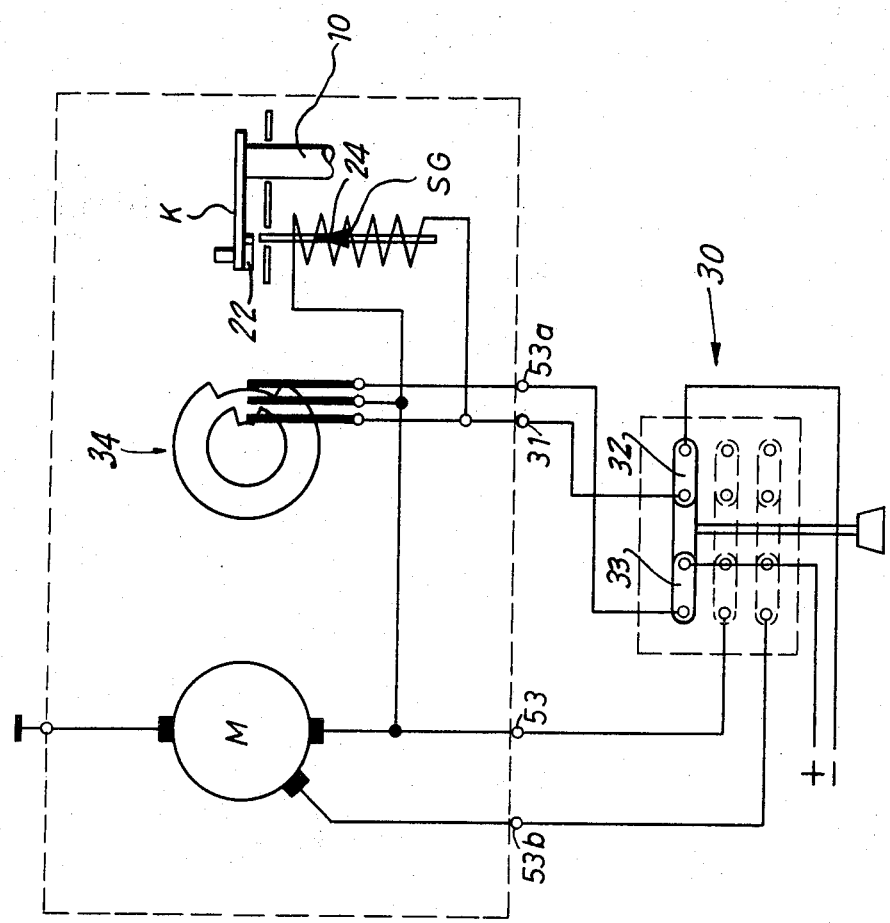
FIG. 6 is a schematic wiring diagram illustrating the switching means for controlling the variation of the crank radius.

The schematic wiring diagram of FIG. 6 illustrates how the switching means for control member or armature SG is connected into the control circuit of the wiper motor, in order to vary the radius of crank K. When wiper switch 30 occupies the illustrated off position, the negative terminal of the supply voltage is connected, through a contact bridge 32 and terminal 31 to one terminal of the electromagnetic switching means. The positive terminal of the supply voltage is connected, through a second contact bridge 33 of the wiper switch and terminal 53a, as well as through reset contacts 34 of drive motor M, to the second terminal of the switching means whenever motor M has a positive potential applied thereto. This is the case also in the disconnected phase of the motor upon return into the wiping field end position. Upon turning off the wiper switch, the circuit means is energized. When motor M reaches the end position, the variation of the crank radius has been effected. The reset contacts of the motor take over, in addition to the disconnection of motor M, also the disconnection of the circuit means.

While specific embodiments of the invention have been shown and described in detail to illustrate the application of the principles of the invention, it will be understood that the invention may be embodied otherwise without departing from such principles.

What is claimed is:

1. In a windshield wiper, particularly for automotive vehicles, having a repose position of the wiper arms which is outside the wiping field, and of the type including a switching device actuated, responsive to opening of the wiper motor control switch, to initiate a repose movement by variation of the radius of a crank secured to a driven shaft driven by the wiper motor, the improvement comprising, in combination, a first crank part secured to said driven shaft to rotate therewith and serving as a guiding part of said crank; a second crank part slidably supported and guided by said first crank part for rotation therewith and limited rectilinear adjustment longitudinally of said first part and radially of said driven shaft; resilient means engaged between said first and second crank parts and constantly biasing said second crank part in one direction relative to said driven shaft to a first limiting position; an abutment on said second part; and a control element insertable into the path of movement of said abutment responsive to actuation of said switching device, to directly engage only said abutment to move said second part longitudinally and rectilinearly of said first part to a second limiting position, increasing the tension of said resilient means, to vary the crank radius for the additional repose movement; said resilient means, responsive to retraction of said control element, instantly restoring said second part to its first limiting position independently of rotation of said crank parts 2. In a windshield wiper, the improvement claimed in claim 1, in which said resilient means comprises at least one tension spring biasing said second crank part in a direction decreasing the crank radius; said control element moving said second crank part against the bias of said resilient means to increase the crank radius.

3. In a windshield wiper, the improvement claimed in claim 1, in which the variation in the crank radius is initiated and executed in the crank end position corresponding to a predetermined wiper field end position; the variation in the crank radius then determining the additional respose movement.

4. In a windshield wiper, the improvement claimed in claim 3, in which said control element is located at a predetermined position relative to the path of the crank.

5. In a windshield wiper, the improvement claimed in claim 1, in which said abutment is a control cam effecting a given displacement of said second crank part along said first crank part.

6. In a windshield wiper, the improvement claimed in claim 1, in which said control element is positioned at a predetermined distance from said driven shaft.

7. In a windshield wiper, the improvement claimed in claim 1, in which said switching device is an electromagnetic switching device; said control element comprising the armature of said electromagnetic switching device.

8. In a windshield wiper, particularly for automotive vehicles, having a repose position of the wiper arms which is outside the wiping field, and of the type including a switching device actuated, responsive to opening of the wiper motor control switch, to initiate a repose movement by variation of the radius of a crank secured to a driven shaft driven by the wiper motor, the improvement comprising, in combination, a first crank part secured to said driven shaft and serving as a guiding part of said crank; a second part supported and guided by said first crank part for limited adjustment longitudinally of said crank; resilient means engaged between said first and second crank parts and biasing said second crank part in one direction relative to said driven shaft; and a control element protruded into the path of movement of said second crank part responsive to actuation of said switching device, to adjust the relative position of said second crank part in opposition to said resilient means, to vary the crank radius for the additional repose movement; including stops fixing the relative position of said first and second crank parts during normal wiper operation.

9. In a windshield wiper, the improvement claimed in claim 8, in which said stops are adjustable to adjust the variation in the crank radius to different lengths;

10. In a windshield wiper, the improvement claimed in claim 8, including control cams on at least one of said second crank part and said control element, and adjustable to adjust the variation of the crank radius to different lengths.

11. In a windshield wiper, particularly for autmotive vehicles, having a repose position of the wiper arms which is outside the wiping field, and of the type including a switching device actuated, responsive to opening of the wiper motor control switch, to initiate a repose movement by variation of the radius of a crank secured to a driven shaft driven by the wiper motor, the improvement comprising, in combination, a first crank part secured to said driven shaft and serving as a guiding part of said crank; a second crank part supported and guided by said first crank part for limited adjustment longitudinally of said crank; resilient means engaged between said first and second crank parts and biasing said second crank part in one direction relative to said driven shaft; and a control element protruded into the path of movement of said second crank part responsive to actuation of said switching device, to adjust the relative position of said second crank part in opposition to said resilient means, to vary the crank radius for the additional repose movement; said first crank part being guided between two spaced substantially parallel covering plates constituting said second crank part; said first crank part and said plates being formed with correlated cutouts; a spring located in said cutouts are connected at one end to said first crank part and at the other end to said covering plates; and a sleeve covering said spring.

12. In a windshield wiper, particularly for automotive vehicles, having a repose position of the wiper arms which is outside the wiping field, and of the type including a switching device actuated, responsive to opening of the wiper motor control switch, to initiate a repose movement by variation of the radius of a crank secured to a driven shaft driven by the wiper motor, the improvement comprising, in combination, a first crank part secured to said driven shaft and serving as a guiding part of said crank; a second crank part supported and guided by said first crank part for limited adjustment longitudinally of said crank; resilient means engaged between said first and second crank parts and biasing said second crank part in one direction relative to said driven shaft; and a control element protruded into the path of movement of said second crank part responsive to actuation of said switching device, to adjust the relative position of said second crank part in opposition to said resilient means, to vary the crank radius for the additional repose movement; said switching device having a first terminal connected to said drive motor, and a second terminal connected, through a back contact in the open position of said wiper motor control switch, with the negative terminal of a source of potential having also a positive terminal.

13. In a windshield wiper, particularly for automotive vehicles, having a repose position of the wiper arms which is outside the wiping field, and of the type including a switching device actuated, responsive to opening of the wiper motor control switch, to initiate a repose movement by variation of the radius of a crank secured to a driven shaft driven by the wiper motor, the improvement comprising, in combiantion, a first crank part secured to said driven shaft to rotate therewith and serving as a guiding part of said crank; a second crank part slidably supported and guided by said first crank part for rotation therewith and limited adjustment longitudinally of said first part and radially of said driven shaft; resilient means engaged between said first and second crank parts and constantly biasing said second crank part in one direction relative to said driven shaft to a first limiting position; an abutment on said second part; a control element insertable into the path of movement of said abutment responsive to actuation of said switching device, to engage said abutment to move said second part longitudinally of said first part to a second limiting position, increasing the tension of said resilient means, to vary the crank radius for the additional repose movement; said resilient means, responsive to retraction of said control element, instantly restoring said second part to its first limiting position independently of rotation of said crank parts; said resilient means comprising at least one compression spring biasing said second crank part in a direction to increase the crank radius; said control element moving said second crank part, against the bias of said resilient means, in a direction to decrease the crank radius.

14. In a windshield wiper, particularly for automotive vehicles, having a repose position of the wiper arms which is outside the wiping field, and of the type including a switching device actuated, responsive to opening of the wiper motor control switch, to initiate a repose movement by variation of the radius of a crank secured to a driven shaft driven by the wiper motor, the improvement comprising, in combination, a first crank part secured to said driven shaft to rotate therewith and serving as a guiding part of said crank; a second crank part slidably supported and guided by said first crank part for rotation therewith and limited adjustment longitudinally of said first part and radially of said driven shaft; resilient means engaged between said first and second crank parts and constantly biasing said second crank part in one direction relative to said driven shaft to a first limiting position; an abutment on said second part; a control element insertable into the path of movement of said abutment responsive to actuation of said switching device, to engage said abutment to move said second part longitudinally of said first part to a second limiting position, increasing the tension of said resilient means, to vary the crank radius for the additional repose movement; said resilient means, responsive to retraction of said control element, instantly restoring said second part to its first limiting position independently of rotation of said crank parts; said second crank part being a frame including two O-shaped guide plates arranged in spaced parallel relation; said first crank part being centrally guided between said guide plates; said resilient means comprising a tension spring connected to a joint bolt on said second crank part and to a bolt connected with said first crank part.

15. In a windshield wiper, particularly for automotive vehicles, having a repose position of the wiper arms which is outside the wiping field, and of the type including a switching device actuated, responsive to opening of the wiper motor control switch, to initiate a repose movement by variation of the radius of a crank secured to a driven shaft driven by the wiper motor, the improvement comprising, in combination, a first crank part secured to said driven shaft to rotate therewith and serving as a guiding part of said crank; a second crank part slidably supported and guided by said first crank part for rotation therewith and limited adjustment longitudinally of said first part and radially of said driven shaft; resilient means engaged between said first and second crank parts and constantly biasing said second crank part in one direction relative to said driven shaft to a first limiting position; an abutment on said second part; a control element insertable into the path of movement of said abutment responsive to actuation of said switching device, to engage said abutment to move said second part longitudinally of said first part to a second limiting position, increasing the tension of said resilient means, to vary the crank radius for the additional repose movement; said resilient means, responsive to retraction of said control element, instantly restoring said second part to its first limiting position independently of rotation of said crank parts; said second crank part being an O-shaped frame having an elongated cutout; a joint bolt secured to said O-shaped frame; said first crank part being adjustable in said elongated cutout; respective springs positioned between the longer sides of said first crank part and of said cutout; and respective covering plates engaging opposite surfaces of said O-shaped frame and covering said frame and said first crank part.

* * * * *